United States Patent
Park et al.

(10) Patent No.: US 10,566,605 B2
(45) Date of Patent: Feb. 18, 2020

(54) ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Hyun-Ki Park, Yongin-si (KR); Jae-Myung Kim, Yongin-si (KR); Deok-Hyun Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/804,192

(22) Filed: Jul. 20, 2015

(65) Prior Publication Data

US 2016/0049638 A1 Feb. 18, 2016

(30) Foreign Application Priority Data

Aug. 13, 2014 (KR) ........................ 10-2014-0105346

(51) Int. Cl.
*H01M 4/13* (2010.01)
*H01M 4/62* (2006.01)
(Continued)

(52) U.S. Cl.
CPC ............. *H01M 4/13* (2013.01); *H01M 4/133* (2013.01); *H01M 4/134* (2013.01); *H01M 4/587* (2013.01); *H01M 4/62* (2013.01); *H01M 4/622* (2013.01); *H01M 4/625* (2013.01); *H01M 4/386* (2013.01); *H01M 4/387* (2013.01); *H01M 10/052* (2013.01); *H01M 2004/021* (2013.01); *H01M 2300/004* (2013.01); *H01M 2300/0034* (2013.01)

(58) Field of Classification Search
CPC ....... H01M 4/13; H01M 10/136; H01M 4/136
See application file for complete search history.

(56) References Cited

U.S. PATENT DOCUMENTS

| 5,510,212 A | 4/1996 | Delnick et al. |
| 2005/0233219 A1 | 10/2005 | Gozdz et al. |

(Continued)

FOREIGN PATENT DOCUMENTS

| JP | 2000-251890 A | | 9/2000 |
| JP | 2003123725 A | * | 4/2003 |

(Continued)

OTHER PUBLICATIONS

Translation JP 2003-123725.*

(Continued)

*Primary Examiner* — Alix E Eggerding
(74) *Attorney, Agent, or Firm* — Knobbe, Martens, Olson & Bear, LLP

(57) ABSTRACT

Provided are an electrode for a rechargeable lithium battery including a current collector and an active material layer positioned on the current collector, the active material layer includes an electrode active material; binder; a composite material including an acrylonitrile-based resin and a carbon-based material positioned on the surface of the acrylonitrile-based resin; and a pore, and a rechargeable lithium battery including the same.

16 Claims, 7 Drawing Sheets

(51) Int. Cl.
*H01M 4/134* (2010.01)
*H01M 4/587* (2010.01)
*H01M 4/133* (2010.01)
*H01M 10/052* (2010.01)
*H01M 4/02* (2006.01)
*H01M 4/38* (2006.01)

(56) References Cited

U.S. PATENT DOCUMENTS

| | | | |
|---|---|---|---|
| 2006/0151318 | A1 | 7/2006 | Park et al. |
| 2008/0138713 | A1 | 6/2008 | Roh et al. |
| 2009/0029249 | A1 | 1/2009 | Takami et al. |
| 2009/0053607 | A1 | 2/2009 | Jeong et al. |
| 2010/0119956 | A1 | 5/2010 | Tokuda et al. |
| 2010/0159334 | A1* | 6/2010 | Kashima ............... H01M 2/162 429/231.95 |
| 2010/0239910 | A1 | 9/2010 | Tode et al. |
| 2010/0297500 | A1 | 11/2010 | Kawai et al. |
| 2010/0323242 | A1 | 12/2010 | Choi et al. |
| 2012/0237826 | A1* | 9/2012 | Kim ...................... H01M 4/505 429/217 |
| 2013/0260207 | A1* | 10/2013 | Uemura ................ H01M 2/16 429/144 |
| 2013/0288117 | A1* | 10/2013 | Kim ........................ H01M 4/64 429/211 |
| 2014/0234708 | A1 | 8/2014 | Park et al. |
| 2017/0008769 | A1* | 1/2017 | Otter ..................... H01M 4/587 |

FOREIGN PATENT DOCUMENTS

| | | |
|---|---|---|
| JP | 2006-228640 A | 8/2006 |
| JP | 2007-234512 A | 9/2007 |
| JP | 2009-026674 A | 2/2009 |
| JP | 2012-028225 A | 2/2012 |
| KR | 10-2007-0090852 A | 9/2007 |
| KR | 10-2009-0016462 A | 2/2009 |
| KR | 10-2009-0020933 A | 2/2009 |
| KR | 10-2014-0104249 A | 8/2014 |

OTHER PUBLICATIONS

U.S. Office Action dated Apr. 6, 2018 for U.S. Appl. No. 14/136,590, which cites the above-identified references numbered 1-4, and which is related to subject U.S. Appl. No. 14/804,192.

U.S. Non-Final Office Action dated Feb. 26, 2019 for U.S. Appl. No. 14/136,590, which is related to subject U.S. Appl. No. 14/804,192. No new references are cited in the Office Action.

Advisory Action dated Sep. 28, 2018 with Examiner-Initiated Interview Summary of Sep. 25, 2018 for U.S. Appl. No. 14/136,590, which is related to subject U.S. Appl. No. 14/804,192.

U.S. Final Office Action dated Jul. 23, 2018 for U.S. Appl. No. 14/136,590, which is related to subject U.S. Appl. No. 14/804,192. No new references are cited in the Final Office Action.

U.S. Office Action dated Dec. 31, 2015 for U.S. Appl. No. 14/136,590, which is related to subject U.S. Appl. No. 14/804,192 and which cites three (3) U.S. Publications previously disclosed in the subject Application.

U.S. Final Office Action dated Aug. 9, 2017 and subsequent Advisory Action dated Oct. 11, 2017, both for U.S. Appl. No. 14/136,590, which is related to subject U.S. Appl. No. 14/804,192.

U.S. Office Action dated Apr. 20, 2017 for U.S. Appl. No. 14/136,590, which is related to subject U.S. Appl. No. 14/804,192, and which cites the above-identified references numbered 1-4.

* cited by examiner

ELECTRODE FOR RECHARGEABLE LITHIUM BATTERY AND RECHARGEABLE LITHIUM BATTERY INCLUDING THE SAME

RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0105346 filed in the Korean Intellectual Property Office on Aug. 13, 2014, the entire contents of which are incorporated herein by reference.

BACKGROUND

Field

This disclosure relates to an electrode for a rechargeable lithium battery and a rechargeable lithium battery including the same.

Description of the Related Technology

A rechargeable lithium battery has recently drawn attention as a power source for small portable electronic devices. It uses an organic electrolyte solution and thereby, has twice or more as high discharge voltage as a conventional battery using an alkali aqueous solution and hence, has a higher energy density.

This rechargeable lithium battery is used by injecting an electrolyte into an electrode assembly including a positive electrode including a positive active material that can intercalate and deintercalate lithium, and a negative electrode including a negative active material that can intercalate and deintercalate lithium.

Graphite used for the negative active material may generally have an active mass density of about 1.5 g/cc to 1.7 g/cc. In case of high active mass density of 1.8 g/cc or higher, it takes a long time for an electrolyte to impregnate into a negative electrode, and an impregnation amount is small, relative to the total amount of electrolyte. In addition, when the electrolyte impregnated into an electrode is slightly depleted, the remaining electrolyte should be additionally impregnated. However, an electrode having high active mass density, has a small inner space and thus it is difficult for the electrolyte to be impregnated. This may cause cycle-life decrease of a battery.

SUMMARY

One embodiment provides an electrode for a rechargeable lithium battery being capable of providing a battery having improved cycle-life characteristics and high-rate charge and discharge characteristics because an impregnation path of an electrolyte or electrolyte reservoir in an electrode may be ensured even in a high active mass electrode.

Another embodiment provides a rechargeable lithium battery including the electrode for a rechargeable lithium battery.

One embodiment provides an electrode for a rechargeable lithium battery that includes a current collector and an active material layer positioned on the current collector, wherein the active material layer includes an active material; a binder; a composite material including an acrylonitrile-based resin and a carbon-based material positioned on the surface of the acrylonitrile-based resin; and pores.

The carbon-based material may include carbon black, sheet-shaped graphite, carbon nanotube, a carbon fiber, or a combination thereof.

The carbon-based material may be coated with an amount of about 0.1 parts by weight to about 200 parts by weight based on 100 parts by weight of the acrylonitrile-based resin.

The carbon-based material may have a diameter of about 20 nm to about 20 μm.

The acrylonitrile-based resin may be included in an amount of about 0.001 Wt % to about 1.1 wt % based on the total amount of the active material layer.

The pore may have a diameter of about 0.1 μm to about 100 μm, and the pore may have a volume of about 15 volume % to about 40 volume %.

The electrode active material may include natural graphite, artificial graphite, Si, $SiO_x$ (0<x<2), a Si-containing alloy, Sn, $SnO_2$, a Sn-containing alloy, Ag, Al, or a combination thereof.

The active material layer may further include a conductive material.

The electrode may have an active mass density of about 1.60 g/cc to about 2.2 g/cc.

The electrode may have an impregnation increase ratio of an electrolyte ranging from about 10 volume % to about 80 volume % relative to an electrode without the composite material.

The electrode may have binding properties of about 0.6 gf/mm to about 3.5 gf/mm.

Another embodiment provides a rechargeable lithium battery including a positive electrode; a negative electrode; and an electrolyte solution impregnating the positive electrode and the negative electrode, wherein at least one of the positive electrode and the negative electrode is the electrode.

Other embodiments are included in the following detailed description.

A battery having improved cycle-life characteristics and high-rate charge and discharge characteristics may be achieved because an impregnation path of an electrolyte or electrolyte reservoir in an electrode may be ensured even in a high active mass electrode.

DETAILED DESCRIPTION

Figure 1:
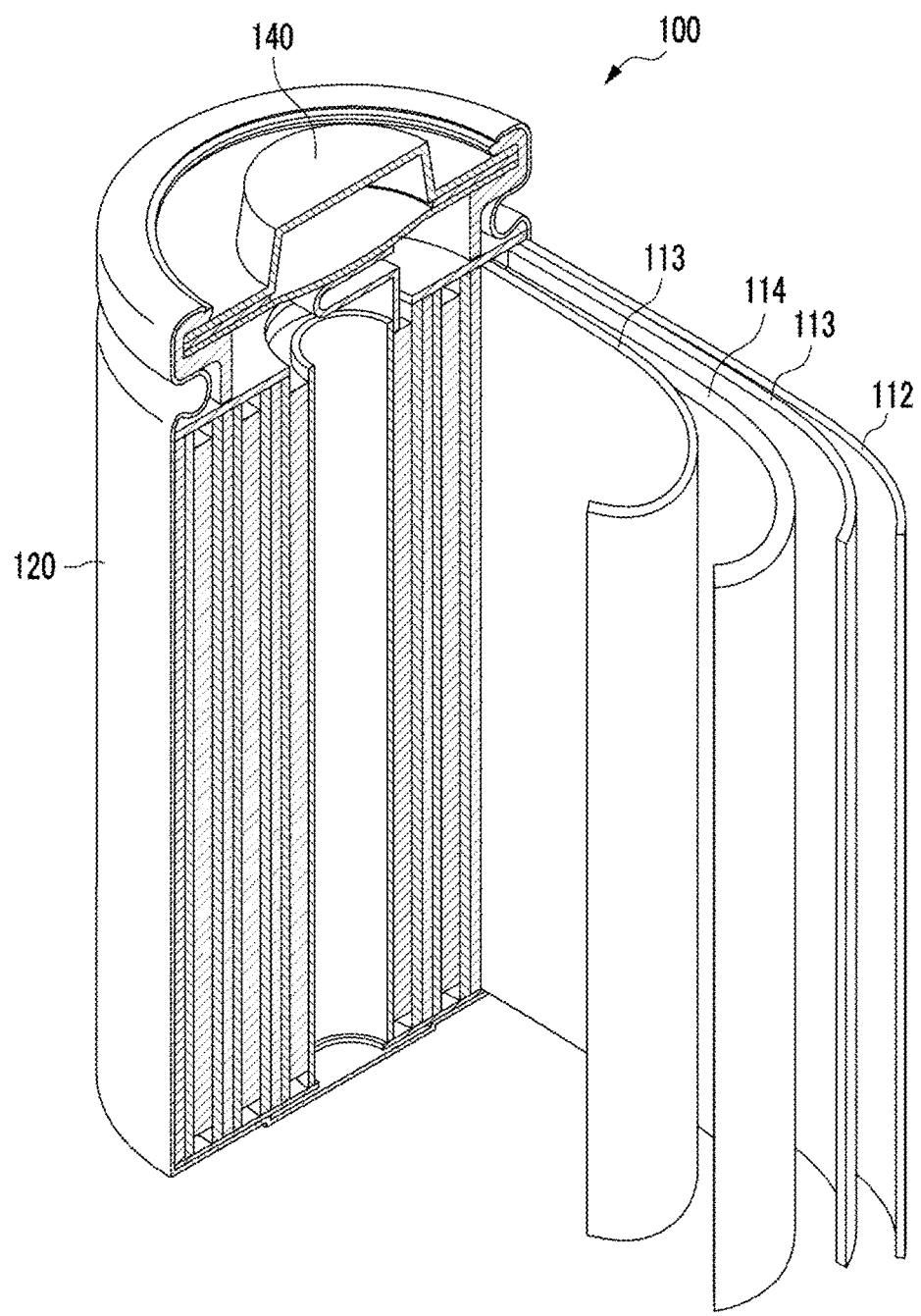
FIG. 1 is a schematic view of a rechargeable lithium battery according to one embodiment.

Exemplary embodiments will hereinafter be described in detail. However, these embodiments are only exemplary, and the present disclosure is not limited thereto.

An electrode for a rechargeable lithium battery according to one embodiment includes a current collector and an active material layer positioned on the current collector, wherein the active material layer includes an active material, a binder, a composite material and pores, and the composite material includes an acrylonitrile-based resin and a carbon-based material positioned on the surface of the acrylonitrile-based resin. The composite material may be derived from a foaming agent coated with the carbon-based material used to form the active material layer and remains inside the electrode.

The electrode according to one embodiment may be an electrode having high active mass density, and the active mass density may be, for example, about 1.60 g/cc to about 2.2 g/cc, specifically about 1.70 g/cc to about 2.2 g/cc, and more specifically about 1.80 g/cc to about 1.96 g/cc.

According to one embodiment, since the active material layer has the pore, an impregnation path or a reservoir for an electrolyte is secured even inside an electrode having high active mass density. Accordingly, the electrode may realize a rechargeable lithium battery having high capacity and excellent cycle-life characteristics and high-rate charge and discharge characteristics.

The pore formed inside the electrode, specifically, an electrode having active mass density of about 1.60 g/cc to about 2.2 g/cc may have a diameter ranging from about 0.1 μm to about 100 μm. The diameter of the pores are the size of the pores formed by using a foaming agent coated with a carbon-based material according to one embodiment, and the diameters of the pores may depend on active mass density. Herein, the pore formed by using a foaming agent coated with a carbon-based material may have a diameter of about 0.1 μm to about 10 μm, specifically, about 3 μm to about 10 μm and more specifically, about 5 μm to about 10 μm. When the pore has a size within the ranges, an electrode having high active mass density internally has a large empty space and thus, secures an impregnation path for an electrolyte through which the electrolyte is smoothly and easily impregnated and in addition, an electrolyte reservoir, which leaves no deplete region of the electrolyte.

The pore formed in the electrode, specifically, an electrode having active mass density of about 1.60 g/cc to about 2.2 g/cc may have a smaller volume than a pore formed inside an electrode having lower active mass density. According to one embodiment, even though porosity decreases in this way, a foaming agent coated with a carbon-based material may more uniformly distribute an electrolyte inside the electrode. The volume of the pore may be in a range of, for example, about 15 volume % to about 40 volume %.

The pore may be formed from a foaming agent coated with a carbon-based material used to form the active material layer.

According to one embodiment, the foaming agent coated with the carbon-based material may be a composite including a foaming agent including an acrylonitrile-based resin and a carbon-based material coated on the surface of the foaming agent.

The foaming agent has a core and shell structure, and herein, the shell includes the acrylonitrile-based resin, and the core may include a hydrocarbon material other than the acrylonitrile-based resin. The hydrocarbon material positioned in the core is gasified within a predetermined temperature range to expand the foaming agent, but the foaming agent contracts during the drying process. This process forms pores having the above size and leaves the acrylonitrile-based resin inside the electrode. Specifically, when the pores are formed by gasification of the hydrocarbon material, the broken or crushed acrylonitrile-based resin remains inside the electrode due to contraction of the foaming agent after the expansion. The drying process may further include a vacuum-drying (VD) which is performed by storing the electrode at about 130° C. to about 160° C. for greater than or equal to about 5 hours in a vacuum chamber to remove moisture therein.

The shell may be about 0.1 μm to about 10 μm thick and specifically, about 0.1 μm to about 5 μm thick.

The foaming agent may have a size of about 2 μm to about 100 μm and specifically, about 10 μm to about 80 μm. The foaming agent may have a size change due to expansion and contraction within the size range.

Accordingly, the acrylonitrile-based resin exists in the active material layer and thus, may increase binding properties of the electrode as well as realize excellent electrolyte impregnation characteristics. The binder may increase bonding properties of the acrylonitrile-based resin and thus, further increase binding properties of the electrode.

The acrylonitrile-based resin may be, for example, a polyacrylonitrile resin.

The acrylonitrile-based resin may be included in an amount of about 0.001 wt % to about 1.1 wt %, and specifically about 0.005 wt % to about 0.2 wt % based on the total amount of the active material layer. When the acrylonitrile-based resin remains in the electrode within the range, improved binding properties of the electrode as well as excellent impregnation characteristics of an electrolyte may be obtained.

The carbon-based material may be coated on the surface of a foaming agent during manufacture of the active material layer but remain coated on the surface of the acrylonitrile-based resin inside the manufactured electrode as the foaming agent expands and contracts.

The carbon-based material may apply conductive characteristics to the foaming agent and thus, improve conductivity, resulting in improved cycle-life characteristics and high-rate charge and discharge characteristics of a rechargeable lithium battery.

The carbon-based material may include carbon black, sheet-shaped graphite, carbon nanotube, a carbon fiber, or a combination thereof.

The carbon-based material may have a diameter of about 20 nm to about 20 μm. Specifically, the carbon black may have a diameter of about 20 nm to about 200 nm, the sheet-shaped graphite may have a diameter of about 5 μm to about 20 μm, and their thicknesses may be less than or equal to hundreds of nanometers. When the carbon-based material has a size within the range, it may be well attached to and coated on the surface of the acrylonitrile-based resin. Herein, the diameter of the sheet-shaped graphite indicates a largest diameter.

The carbon-based material may be coated in an amount of about 0.1 parts by weight to about 200 parts by weight, and specifically about 30 parts by weight to about 80 parts by weight based on 100 parts by weight of the acrylonitrile-based resin. When the carbon-based material is coated within the ranges, excellent conductivity improvement is obtained and results in further enhancing cycle-life characteristics and high-rate charge and discharge characteristics of a rechargeable lithium battery.

The active material may be any positive active material and negative active material which are used for a rechargeable lithium battery.

Specifically, the positive active material may be a compound (lithiated intercalation compound) being capable of intercalating and deintercalating lithium, and may be, for example compounds represented by the following chemical formulae.

$Li_aA_{1-b}B_bD'_2$ (0.90≤a≤1.8 and 0≤b≤0.5); $Li_aE_{1-b}BB_bO_{2-c}D'_c$ (0.90≤a≤1.8, 0≤b≤0.5, 0≤c≤0.05); $Li_aE_{2-b}B_bO_{4-c}D'_c$ (0.90≤a≤1.8, 0≤b≤0.5, 0≤c≤0.05); $Li_aNi_{1-b-c}Co_bB_cD'_\alpha$ (0.90≤a≤1.8, 0≤b≤0.5, 0≤c≤0.05, 0≤α≤2); $Li_aNi_{1-b-c}Co_bB_cO_{2-\alpha}F'_\alpha$ (0.90≤a≤1.8, 0≤b≤0.5, 0≤c≤0.05, 0≤α≤2); $Li_aNi_{1-b-c}Co_bB_cO_{2-\alpha}F'_2$ (0.90≤a≤1.8, 0≤b≤0.5, 0≤c≤0.05, 0≤α≤2); $Li_aNi_{1-b-c}Mn_bB_cD'_\alpha$ (0.90≤a≤1.8, 0≤b≤0.5, 0≤c≤0.05, 0≤α≤2); $Li_aNi_{1-b-c}Mn_bB_cO_{2-\alpha}F'_\alpha$ (0.90≤a≤1.8, 0≤b≤0.5, 0≤c≤0.05, 0≤α≤2); $Li_aNi_{1-b-c}Mn_bB_cO_{2-\alpha}F'_2$ (, 0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D' is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof The negative active material may be a material that reversibly intercalates/deintercalates lithium ions, a lithium metal, a lithium metal alloy, a material being capable of doping and de-doping lithium, or transition metal oxide.

The material that reversibly intercalates/deintercalates lithium ions may be a carbon material which is any generally-used carbon-based negative active material rechargeable lithium battery, and examples thereof may be crystalline carbon, amorphous carbon, or a mixture thereof Examples of the crystalline carbon may be graphite such as amorphous, sheet-shape, flake, spherical shape or fiber-shaped natural graphite or artificial graphite, and examples of the amorphous carbon may be soft carbon or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and de-doping lithium may be Si, $SiO_x$ (0<x<2), a Si-C composite, a Si-Y alloy (wherein, the Y is an element selected from an alkali metal, an alkaline-earth metal, Group 13 to 16 elements, a transition metal, a rare earth element, and a combination thereof, and not Si), Sn, $SnO_2$, a Sn-C composite, Sn-Y (wherein, the Y is an element selected from an alkali metal, an alkaline-earth metal, Group 13 to 16 elements, a transition metal, a rare earth element, and a combination thereof, and not Sn), and the like, and at least one of these may be mixed with $SiO_2$. Specific examples of the Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof The transition metal oxide may be vanadium oxide, lithium vanadium oxide, and the like.

In one embodiment, the electrode active material may be preferably natural graphite, artificial graphite, Si, $SiO_x$ (0<x<2), a Si-containing alloy, Sn, $SnO_2$, a Sn-containing alloy, Ag, Al or a combination thereof, and more preferably natural graphite.

The binder improves binding properties between the electrode active material and the acrylonitrile-based resin, and the electrode active material with the current collector. The binder includes a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. Such a thickener may be included in an amount of about 0.1 parts by weight to about 3 parts by weight based on 100 parts by weight of the negative active material.

The electrode active material layer may further include a conductive material.

The conductive material improves electrical conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof The active material layer may be formed on the current collector. The current collector may be an aluminum foil, a copper foil, a nickel foil, a stainless steel foil, a titanium foil, a nickel foam, a copper foam, a polymer substrate coated with a conductive metal, or a combination thereof, but is not limited thereto.

The electrode according to one embodiment, specifically having active mass density of about 1.60 g/cc to about 2.2 g/cc includes the composite material, that is, the composite material including an acrylonitrile-based resin and a carbon-based material positioned on the surface of the acrylonitrile-based resin and thus has an impregnation increase ratio of an electrolyte ranging from about 10 volume % to about 80 volume %, specifically about 30 volume % to about 80 volume % relative to an electrode without the composite material. That is, the impregnation of an electrolyte of the electrode including the composite material is about 10 volume % to about 80 volume % higher than that of the electrode without the composite material. The electrode has an impregnation increase ratio of an electrolyte within the range and may realize a rechargeable lithium battery having excellent cycle-life characteristics and high-rate charge and discharge characteristics.

The impregnation increase ratio of an electrolyte may be measured by using a dipping measurement system. Specifically, the impregnation increase ratio of an electrolyte may be measured by coating the composition for an active material layer on both sides of a current collector to manufacture an electrode, loading the electrode on an upper scale in the dipping measurement system, impregnating about 0.5 mm to about 2.0 mm-long end of the electrode with the electrolyte, and measuring the amount of the electrolyte permeated into the electrode due to a capillary phenomenon.

The electrode according to one embodiment, specifically, an electrode having active mass density ranging from about 1.60 g/cc to about 2.2 g/cc may have binding properties of about 0.6 gf/mm to about 3.5 gf/mm and specifically, about 0.8 gf/mm to about 1.4 gf/mm. When the electrode has binding properties within the ranges, a rechargeable lithium battery having excellent cycle-life characteristics and high-rate charge and discharge characteristics may be achieved. The binding properties may be obtained by measuring strength in a length direction when the electrode is attached to a surface of a glass coated with an adhesive having an area of about 1.0 $cm^2$ to about 3.0 $cm^2$ on a glass and taken off The electrode may be manufactured by coating the composition for an active material layer on a current collector and then, drying and compressing it.

The current collector is the same as described above.

The composition for an active material layer may include an active material, a binder and a foaming agent coated with a carbon-based material, and may further include a conductive material.

The active material, the binder, the foaming agent coated with the carbon-based material and the conductive material are the same as described above.

The foaming agent coated with the carbon-based material may be prepared in a physical adsorption method of primarily mixing the foaming agent and the carbon-based material, heating, and secondarily mixing. In addition, the foaming agent coated with the carbon-based material may be prepared in a binder-using method of primarily mixing the foaming agent and the carbon-based material, heating, adding a binder and secondarily mixing. The polymer-using method may be desirably used out of these methods.

The polymer may improve adsorption characteristics of the carbon-based material and help the carbon-based material well-absorbed on the surface of the foaming agent.

Examples of the binder may be carboxylmethyl cellulose (CMC), acrylonitrile, a styrene-butadiene rubber (SBR), polyacrylic acid (PAA), polyvinylidene fluoride (PVdF), or a combination thereof The heating may be performed at about 50° C. to about 110° C. and specifically, about 60° C. to about 80° C.

The secondary mixing may be performed at a high speed with a mill.

The foaming agent may be included in an amount of about 0.001 wt % to about 1.1 wt % and specifically, about 0.005 wt % to about 0.2 wt % based on the total amount of the composition for an active material layer. When the foaming agent is used within the ranges, excellent impregnation characteristics of an electrolyte into the electrode and excellent binding properties of the electrode may be obtained.

The above electrode may be at least one of the positive electrode and the negative electrode of the rechargeable lithium battery.

Hereinafter, a rechargeable lithium battery including the electrode is described referring to FIG. 1.

FIG. 1 is a schematic view showing a rechargeable lithium battery according to one embodiment.

Referring to FIG. 1, a rechargeable lithium battery 100 according to one embodiment includes a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120.

At least one of the positive electrode and the negative electrode may be the above electrode.

The electrolyte solution includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

Particularly, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from about 1:1 to about 1:9.

In addition, the ester-based solvent may be, for example methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may be, for example dibutylether, tetraglyme, diglyme, dimethoxyethane, 2-methyltetrahydrofuran, tetrahydrofuran, and the like, and the ketone-based solvent may be cyclohexanone, and the like. In addition, the alcohol-based solvent may be ethanol, isopropyl alcohol, and the like.

The non-aqueous organic solvent may be used singularly or in a mixture, and when the organic solvent is used in a mixture, the mixture ratio may be controlled in accordance with a desirable battery performance.

The non-aqueous electrolyte solution may further include an overcharge inhibitor such as ethylene carbonate, pyrocarbonate and the like.

The lithium salt is dissolved in a non-aqueous organic solvent, supplies lithium ions in a battery, operates a basic operation of the rechargeable lithium battery, and improves lithium ion transportation between positive and negative electrodes therein.

Specific examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are natural numbers, e.g. an integer of 1 to 20, LiCl, LiI, $LiB(C_2O_4)_2$ (lithium bisoxalato borate (LiBOB)), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 113 may include any materials commonly used in the conventional lithium battery as long as separating a negative electrode 112 from a positive electrode 114 and providing a transporting passage for lithium ion. In other words, the separator 113 may have a low resistance to ion transportation and an excellent impregnation for an electrolyte solution. For example, it may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

EXAMPLE 1

A negative active material layer composition was prepared by mixing 98 Wt % of natural graphite, 1 wt % of carboxylmethyl cellulose (CMC), 1 wt % of styrene-butadiene rubber (SBR) and 0.1 parts by weight of a composite (the natural graphite, 100 parts by weight of the total weight of the CMC and the SBR) and dispersing the mixture into water. Herein, the composite was obtained by mixing a foaming agent including an acrylonitrile-based resin (a size: 20 μm to 40 μm, FA80DE made by Matsumoto Yushi-seiyaku Co. Ltd.) and Denka Black having a diameter of 50 nm in weight ratio of 2:1, heating the mixture at 60° C. for 10 minutes, adding carboxylmethyl cellulose (CMC) in a small amount thereto, and mixing the mixture with a mill for 3 minutes at a high speed to coat the carbon black on the surface of the foaming agent. The negative active material layer composition was coated on a 15 μm-thick copper foil and then, dried and compressed, manufacturing a negative electrode having active mass density of 1.8 g/cc.

The negative electrode and a lithium metal as a counter electrode for the negative electrode were housed into a battery case, and an electrolyte solution was injected thereinto, manufacturing a rechargeable lithium battery cell.

Herein, the electrolyte solution was prepared by mixing ethylenecarbonate (EC), diethyl carbonate (DEC) and fluoroethylene carbonate (FEC) in a volume ratio of 5:70:25 and dissolving 1.3 M $LiPF_6$ in the mixed solvent.

EXAMPLE 2

A rechargeable lithium battery cell was manufactured according to the same method as Example 1 except for using a composite obtained by mixing a foaming agent including an acrylonitrile-based resin (a size: 20 μm to 40 μm, FA80DE made by Matsumoto Yushi-seiyaku Co. Ltd., Osaka, Japan) and sheet-shaped graphite having a diameter of 6 μm (SFG6, Timcal Ltd., Richmond, USA) in a weight ratio of 2:1, heating the mixture at 60° C. for 10 minutes, and mixing it with a mill at a high speed for 3 minutes to coat the sheet-shaped graphite on the surface of the foaming agent.

EXAMPLE 3

A rechargeable lithium battery cell was manufactured according to the same method as Example 1 except for using a composite obtained by mixing a foaming agent including an acrylonitrile-based resin (a size: 20 μm to 40 μm, FA80DE made by Matsumoto Yushi-seiyaku Co. Ltd.), sheet-shaped graphite having a diameter of 6 μm (SFG6 made by Timcal Ltd.) and carboxylmethyl cellulose (CMC) in a weight ratio of 10:5:1, heating the mixture at 60° C. for 10 minutes, an then, mixing it with a mill at a high speed for 5 minutes to coat the sheet-shaped graphite on the surface of the foaming agent.

EXAMPLE 4

A rechargeable lithium battery cell was manufactured according to the same method as Example 1 except for using a composite obtained by using Denka Black having a diameter of 30 nm diameter.

EXAMPLE 5

A rechargeable lithium battery cell was manufactured according to the same method as Example 1 except for using a composite obtained by using Denka Black having a diameter of 20 nm.

EXAMPLE 6

A rechargeable lithium battery cell was manufactured according to the same method as Example 2 except for using a composite obtained by using sheet-shaped graphite having a diameter of 10 μm (SFG10, Timcal Ltd.).

EXAMPLE 7

A rechargeable lithium battery cell was manufactured according to the same method as Example 2 except for using a composite obtained by using sheet-shaped graphite having a diameter of 15 μm diameter (SFG15, Timcal Ltd.).

EXAMPLE 8

A rechargeable lithium battery cell was manufactured according to the same method as Example 3 except for using a composite obtained by using a mixture of sheet-shaped graphite having a diameter of 6 μm (SFG6, Timcal Ltd.) and sheet-shaped graphite having a diameter of 10 μm (SFG10, Timcal Ltd.) in a weight ratio of 1:1.

EXAMPLE 9

A rechargeable lithium battery cell was manufactured according to the same method as Example 3 except for using a composite obtained by using a mixture of sheet-shaped graphite having a diameter of 6 μm (SFG6, Timcal Ltd.) and sheet-shaped graphite having a diameter of 15 μm (SFG15, Timcal Ltd.) in a weight ratio of 1:1.

COMPARATIVE EXAMPLE 1

A rechargeable lithium battery cell was manufactured according to the same method as Example 1 except for mixing 98 wt % of natural graphite, 1 wt % of carboxylmethyl cellulose and 1 wt % of a styrene-butadiene rubber and dispersing the mixture into water to prepare a negative active material layer composition.

COMPARATIVE EXAMPLE 2

A rechargeable lithium battery cell was manufactured according to the same method as Example 1 except for mixing 98 wt % of natural graphite, 1 wt % of carboxylmethyl cellulose (CMC), 1 wt % of a styrene-butadiene rubber (SBR) and 0.5 parts by weight a foaming agent including no acrylonitrile-based resin (ACL2, Kumyang Co., Ltd.) (based on 100 parts by weight of the total weight of the natural graphite, the CMC and the SBR) and dispersing the mixture into water to prepare a negative active material layer composition.

COMPARATIVE EXAMPLE 3

A rechargeable lithium battery cell was manufactured according to the same method as Example 1 except for mixing 98 wt % of natural graphite, 1 wt % of carboxylmethyl cellulose (CMC), 1 wt % of a styrene-butadiene rubber (SBR) and 0.2 parts by weight of a foaming agent including an acrylonitrile-based resin (a size: 20 μm to 40 μm, FA80DE made by Matsumoto Yushi-seiyaku Co. Ltd.) and 0.1 parts by weight of Denka Black having a diameter of 50 nm based on 100 parts by weight of the total weight of the natural graphite, the CMC and the SBR and dispersing the mixture into water to prepare a negative active material layer composition.

Evaluation 1: Scanning Electron Microscope (Sem) Image Analysis of Foaming Agent Coated With Carbon-Based Material FIGS. 2A to 2C are 2000, 10000 and 25000 magnified scanning electron microscope (SEM) photographs of the composite according to Example 1.

Figure 2A:
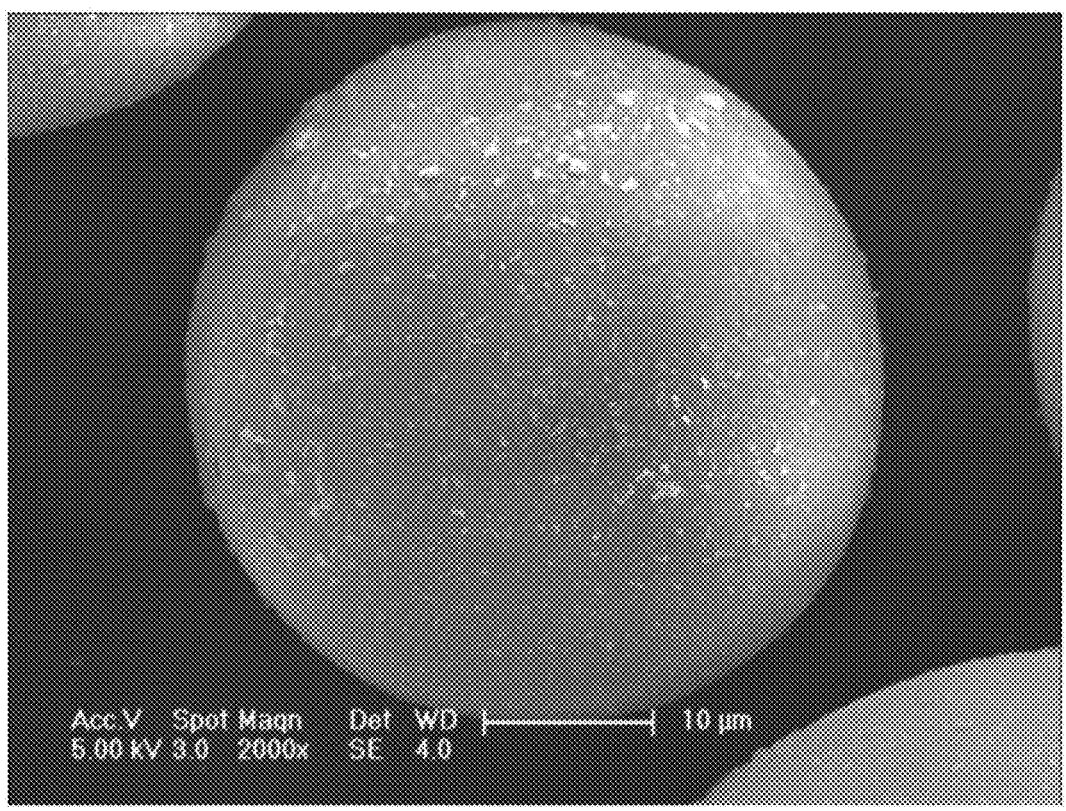
FIGS. 2A to 2C are 2000, 10000 and 25000 magnified scanning electron microscope (SEM) photographs of the composite according to Example 1.
Figure 2B:
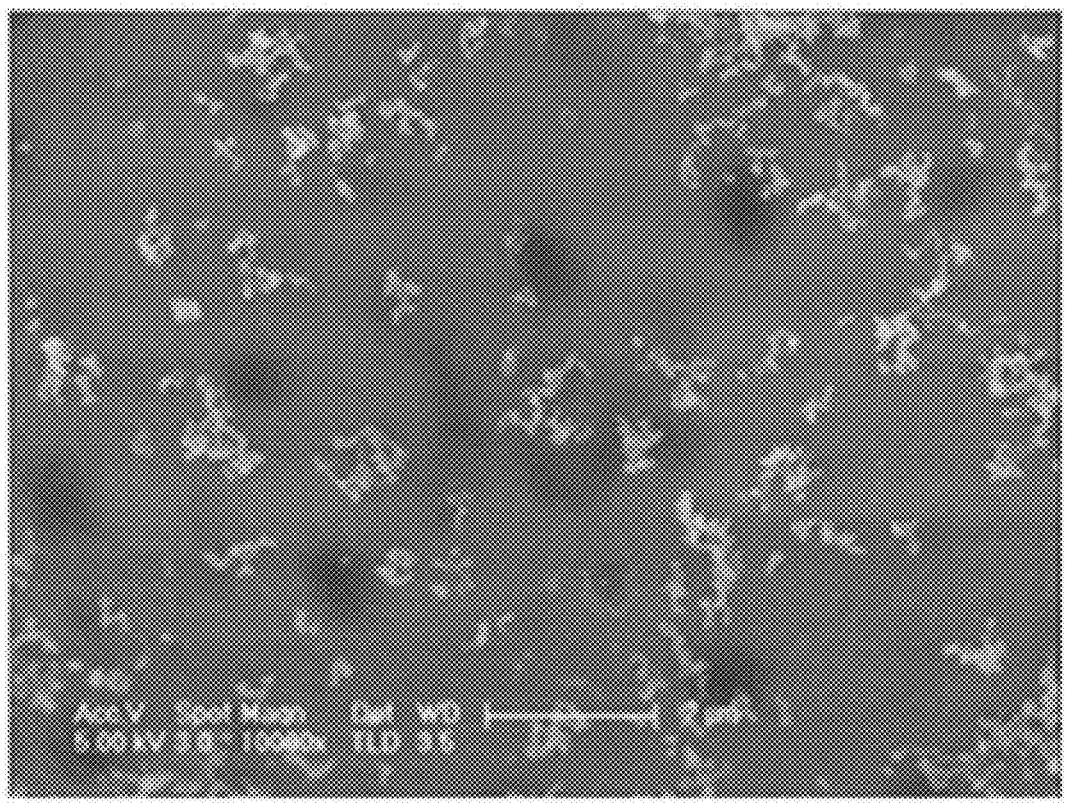
Figure 2C:
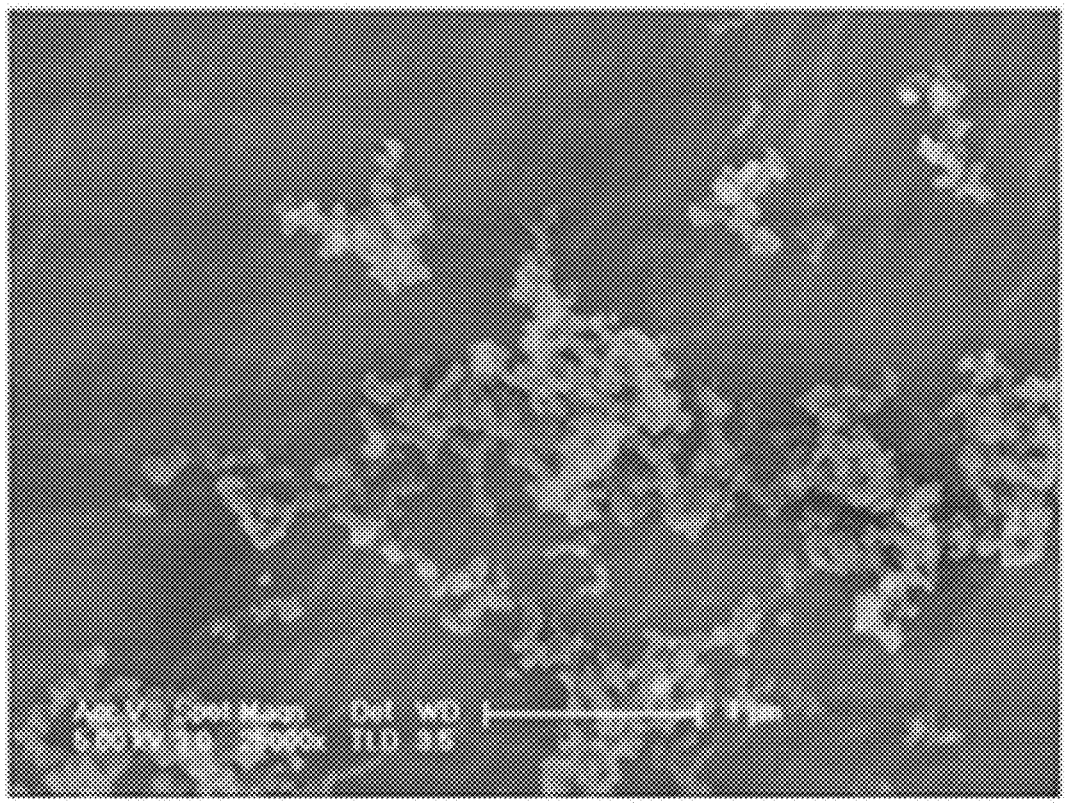

Referring to FIGS. 2A to 2C, the composite of Example 1 was obtained by coating a carbon-based material on the surface of a spherical foaming agent.

Evaluation 2: Impregnation Properties Analysis of Electrolyte Solution

Impregnation increase ratio of an electrolyte solution into the electrodes according to Examples 1 to 9 and Comparative Examples 1 to 3 was measured by using a dipping measurement system in the following method, and the results are provided in the following Table 1.

Each negative active material layer composition according to Examples 1 to 9 and Comparative Examples 1 to 3 was coated on both sides of a 15 μm-thick copper foil to manufacture a negative electrode with a size of 3×3 cm², and the negative electrode was put on an upper scale of the dipping measurement system. Then, the about 1 mm-long end of the negative electrode was impregnated with the electrolyte solution, and the amount of electrolyte solution internally permeated into the negative electrode due to a capillary phenomenon was measured.

TABLE 1

| | Impregnation increase ratio of electrolyte solution relative to Comparative Example 1 (volume %) |
|---|---|
| Example 1 | 50 |
| Example 2 | 60 |
| Example 3 | 38 |
| Example 4 | 40 |
| Example 5 | 45 |
| Example 6 | 40 |
| Example 7 | 40 |
| Example 8 | 45 |
| Example 9 | 60 |
| Comparative Example 1 | reference |
| Comparative Example 2 | 35 |
| Comparative Example 3 | 25 |

Referring to Table 1, the electrodes according to Examples 1 to 9 using a foaming agent coated with a carbon-based material and thus, including an acrylonitrile-based resin coated with the carbon-based material showed an increased impregnation increase ratio of an electrolyte solution compared with Comparative Example 1 including no foaming agent coated with a carbon-based material, Comparative Example 2 using a foaming agent including no acrylonitrile-based resin, and Comparative Example 3 using a simple mixture of the acrylonitrile-based resin and the carbon-based material.

Evaluation 3: Binding Properties Analysis of Electrode

Binding properties of the electrodes according to Examples 1 to 9 and Comparative Examples 1 to 3 were measured by using a binding property-measuring instrument, and the results are provided in the following Table 2.

The binding properties were measured by measuring strength along the direction of the length when the electrodes according to Examples 1 to 9 and Comparative Examples 1 to 3 were respectively attached to a surface of a glass coated with an adhesive having 1 cm² of an area on a glass and then taken off.

TABLE 2

| | Binding properties of electrode (gf/mm) |
|---|---|
| Example 1 | 1.2 |
| Example 2 | 1.1 |
| Example 3 | 1.1 |
| Example 4 | 1.0 |
| Example 5 | 0.95 |
| Example 6 | 1.1 |
| Example 7 | 1.0 |
| Example 8 | 1.2 |
| Example 9 | 1.0 |
| Comparative Example 1 | 0.84 |
| Comparative Example 2 | 0.9 |
| Comparative Example 3 | 0.95 |

Referring to Table 2, the electrodes according to Examples 1 to 9 using a foaming agent coated with a carbon-based material and there inside including an acrylonitrile-based resin coated with the carbon-based material showed excellent binding properties compared with Comparative Example 1 using no foaming agent coated with a carbon-based material, Comparative Example 2 using a foaming agent including no acrylonitrile-based resin and Comparative Example 3 using a simple mixture of the acrylonitrile-based resin and the carbon-based material.

Evaluation 4: Cycle-Life Characteristics

The rechargeable lithium battery cells according to Examples 1 to 9 and Comparative Examples 1 and 2 were charged and discharged in the following method, and the results are provided in FIGS. 3 and 4.

Charge: 1.0 C CC/CV mode

Discharge: 0.01 C cut-off/1.0 C CV mode 1.5 V cut-off

Figure 3:
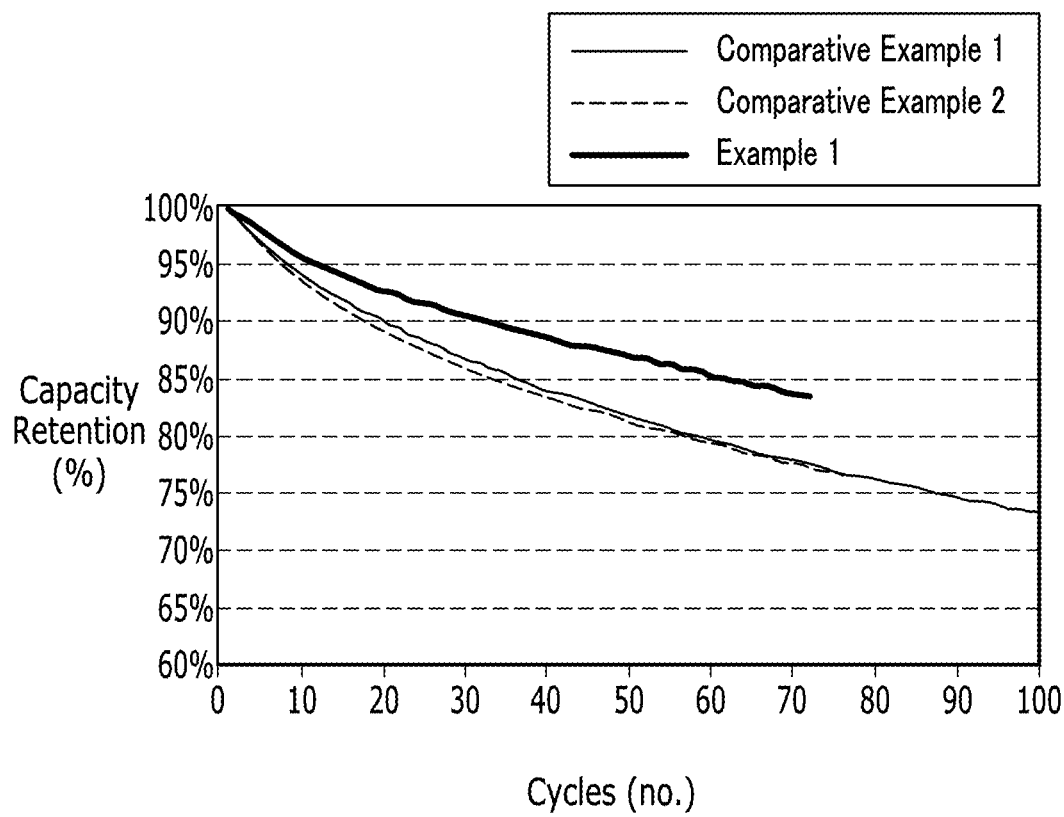
FIG. 3 is a graph showing cycle-life characteristics of rechargeable lithium battery cells according to Example 1 and Comparative Examples 1 and 2.
Figure 4:
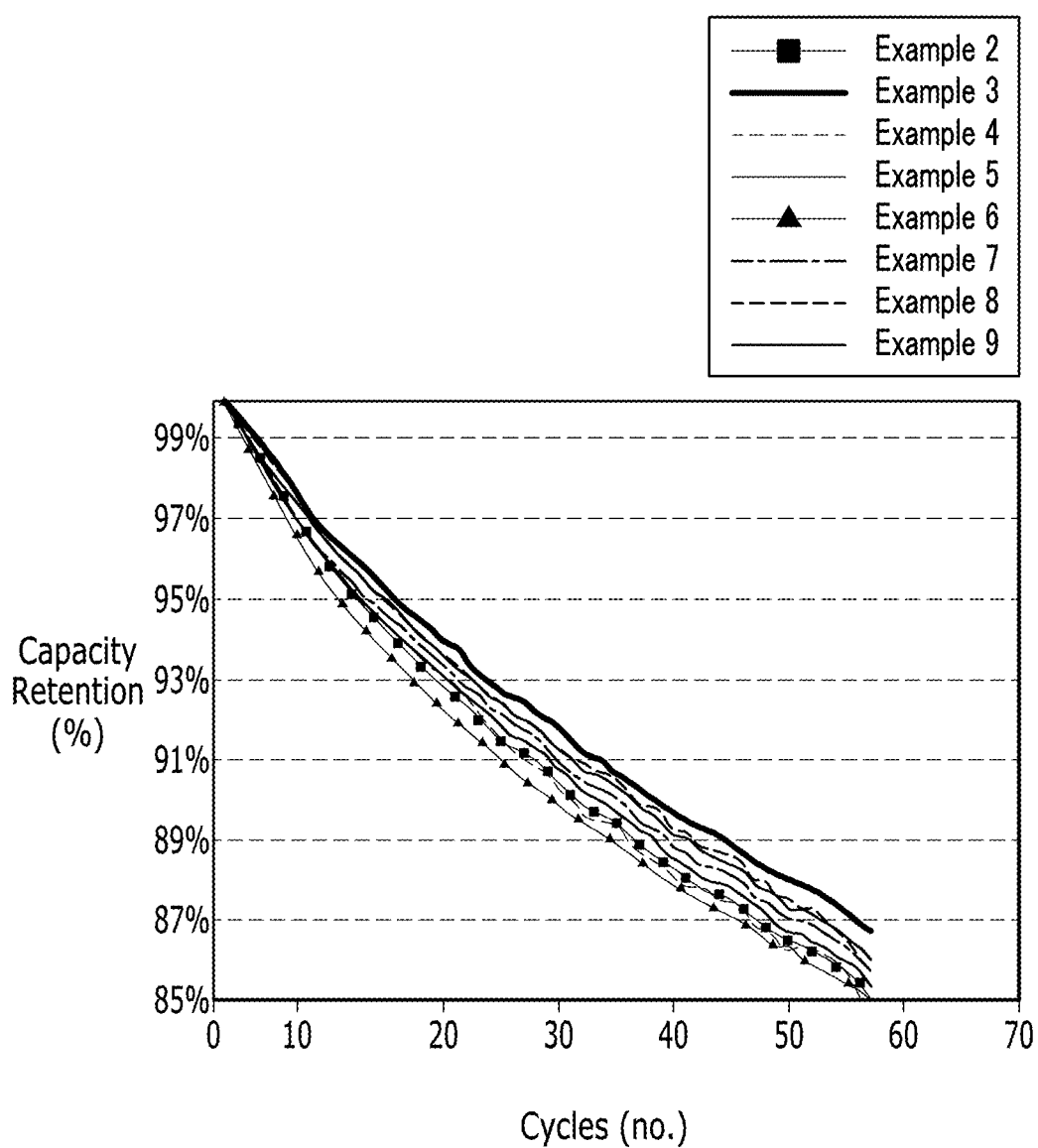
FIG. 4 is a graph showing cycle-life characteristics of rechargeable lithium battery cells according to Examples 2 to 9.

FIG. 3 is a graph showing cycle-life characteristics of the rechargeable lithium battery cells according to Example 1 and Comparative Examples 1 and 2, and FIG. 4 is a graph showing cycle-life characteristics of the rechargeable lithium battery cells according to Examples 2 to 9.

Referring to FIGS. 3 and 4, Examples 1 to 9 using a foaming agent coated with a carbon-based material and there inside including an acrylonitrile-based resin coated with the carbon-based material showed a small capacity retention change and thus, excellent cycle-life characteristics compared with Comparative Example 1 using no foaming agent coated with a carbon-based material and Comparative Example 2 using a foaming agent including no acrylonitrile-based resin.

Evaluation 5: High-Rate Charge and Discharge Characteristics

The rechargeable lithium battery cells according to Examples 1 to 9 and Comparative Examples 1 to 3 were charged and discharged in the following method, and the results are provided in the following Table 3 and FIG. 5.

Charge: 0.2 C charge, cut-off at 0.01 C
Discharge: 0.2 C, 0.5 C, 1.0 C, 2.0 C, 3.0 C, 5.0 C, cut-off at 1.5 V In the following Table, 0.2 C/0.2 C efficiency (%), for example, was obtained as a percentage of discharge capacity at a 0.2 C-rate relative to charge capacity at the 0.2C-rate, and 5.0 C/0.2 C efficiency (%) was obtained as a percentage of discharge capacity at a 5.0 C-rate relative to charge capacity at the 0.2 C-rate.

TABLE 3

|  | 0.2 C/0.2 C effciency (%) | 0.5 C/0.2 C effciency (%) | 1.0 C/0.2 C efficiency (%) | 2.0 C/0.2 C efficiency (%) | 3.0 C/0.2 C efficiency (%) | 5.0 C/0.2 C efficiency (%) |
|---|---|---|---|---|---|---|
| Example 1 | 99.9 | 98.9 | 98.8 | 97.1 | 92.0 | 91.1 |
| Example 2 | 99.8 | 97.8 | 98.0 | 96.0 | 93.0 | 90.1 |
| Example 3 | 99.6 | 97.9 | 97.8 | 94.0 | 92.0 | 89.5 |
| Example 4 | 99.7 | 98.1 | 97.5 | 94.1 | 93.1 | 92.1 |
| Example 5 | 99.8 | 98.4 | 98.6 | 96.0 | 95.1 | 93.1 |
| Example 6 | 99.8 | 99.1 | 98.8 | 97.9 | 96.9 | 94.9 |
| Example 7 | 99.6 | 98.9 | 98.2 | 95.9 | 96.4 | 92.9 |
| Example 8 | 99.8 | 97.8 | 98.8 | 94.8 | 92.1 | 91.1 |
| Example 9 | 99.6 | 98.4 | 97.6 | 96.2 | 94.5 | 91.0 |
| Comparative Example 1 | 99.5 | 96.4 | 93.7 | 90.1 | 85.5 | 81.5 |
| Comparative Example 2 | 99.2 | 95.6 | 88.3 | 87.5 | 83.3 | 80.8 |
| Comparative Example 3 | 99.4 | 96.2 | 94.2 | 91.1 | 87.1 | 85.4 |

Figure 5:
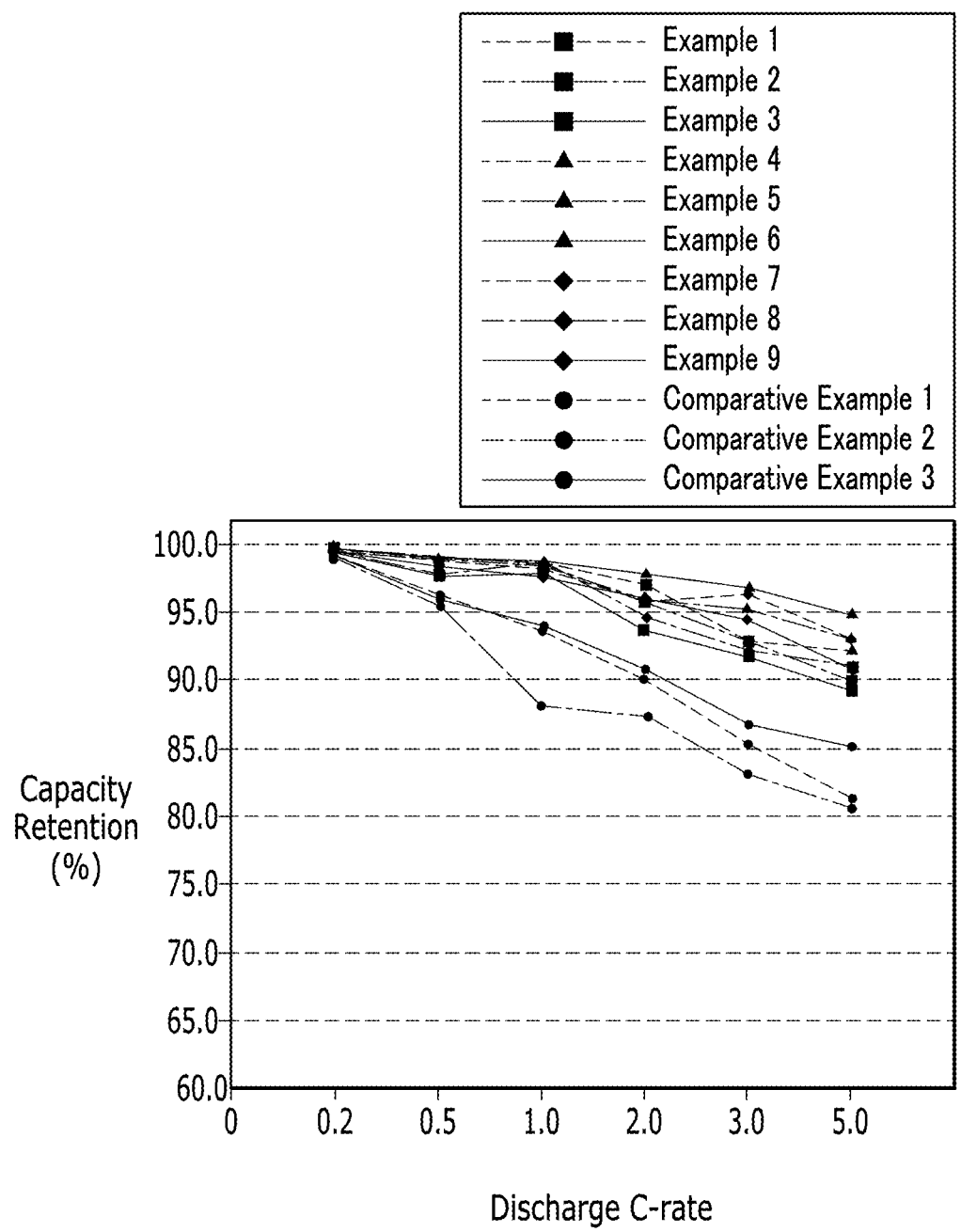
FIG. 5 is a graph showing high-rate charge and discharge characteristics of the rechargeable lithium battery cells according to Examples 1 to 9 and Comparative Examples 1 to 3.

FIG. 5 is a graph showing high-rate charge and discharge characteristics of the rechargeable lithium battery cells according to Examples 1 to 9 and Comparative Examples 1 to 3.

Referring to Table 3 and FIG. 5, Examples 1 to 9 using a foaming agent coated with a carbon-based material and there inside including an acrylonitrile-based resin coated with the carbon-based material showed excellent high-rate charge and discharge characteristics compared with Comparative Example 1 using no foaming agent coated with a carbon-based material, Comparative Example 2 using a foaming agent using no acrylonitrile-based resin and Comparative Example 3 using a mixture of the acrylonitrile-based resin and the carbon-based material.

In the present disclosure, the terms "Example" and "Comparative Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claim.

What is claimed is:

1. An electrode for a rechargeable lithium battery, comprising:
a current collector and an active material layer positioned on the current collector,
wherein the active material layer comprises:
an active material;
a binder;
a composite material including an acrylonitrile-based resin, wherein the acrylonitrile-based resin is polyacrylonitrile resin and a carbon-based material attached to and coated on the surface of the acrylonitrile-based resin;
wherein the carbon-based material comprises carbon black, sheet-shaped graphite, carbon nanotube, a carbon fiber, or a combination thereof;
wherein the carbon-based material has a diameter of about 20 nm to about 20 µm;
wherein the carbon-based material is coated in an amount of about 0.1 parts by weight to about 200 parts by weight based on 100 parts by weight of the acrylonitrile-based resin; and
a pore;
wherein the pore is comprised of a foaming agent coated with the carbon-based material, and wherein the foaming agent includes the acrylonitrile-based resin.

2. The electrode for a rechargeable lithium battery of claim 1, wherein the acrylonitrile-based resin is included in an amount of about 0.001 wt % to about 1.1 wt % based on the total amount of the electrode active material layer.

3. The electrode for a rechargeable battery of claim 1, wherein the foaming agent further comprises of a core and shell structure.

4. The electrode for a rechargeable battery of claim 1, wherein the foaming agent has a size of about 2 µm to about 100 µm.

5. The electrode for a rechargeable lithium battery of claim 1, wherein the pore has a diameter of about 0.1 µm to about 100 µm.

6. The electrode for a rechargeable lithium battery of claim 1, wherein the pore has a volume of about 15 volume % to about 40 volume %.

7. The electrode for a rechargeable lithium battery of claim 1, wherein the electrode active material comprises natural graphite, artificial graphite, Si, $SiO_x$ (0<x<2), a Si-containing alloy, Sn, $SnO_2$, a Sn-containing alloy, Ag, Al, or a combination thereof.

8. The electrode for a rechargeable lithium battery of claim 1, wherein the electrode active material layer further comprises a conductive material.

9. The electrode for a rechargeable lithium battery of claim 1, wherein the electrode has an active mass density of about 1.60 g/cc to about 2.2 g/cc.

10. The electrode for a rechargeable lithium battery of claim 1, wherein the electrode has about 10 volume % to about 80 volume % of an impregnation increase ratio of an electrolyte solution relative to an electrode without the composite material.

11. The electrode for a rechargeable lithium battery of claim 1, wherein the binding properties of the electrode is 0.6 gf/mm to 3.5 gf/mm.

12. A rechargeable lithium battery comprising
a positive electrode;
a negative electrode; and
an electrolyte solution impregnating the positive electrode and the negative electrode,
wherein at least one of the positive electrode and the negative electrode is the electrode of claim 1.

13. A rechargeable lithium battery of claim 12, wherein the electrolyte solution further comprises a non-aqueous organic solvent and a lithium salt.

14. A rechargeable lithium battery of claim 12, wherein the electrolyte solution comprises a lithium salt such as $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers selected from any one of 1 to 20, LiCl, LiI, $LiB(C_2O_4)_2$ (lithium bisoxalato borate (LiBOB)), or a combination thereof.

15. A rechargeable lithium battery of claim 12, wherein the electrolyte solution comprises a lithium salt in a concentration ranging from about 0.1 M to about 2.0 M.

16. A rechargeable lithium battery of claim 12, wherein the electrolyte solution comprises a non-aqueous organic solvent selected from a group consisting of carbonate-based, ester-based, ether-based, ketone-based, alcohol-based, or aprotic solvent.

* * * * *